M. STEPHENS.
Pipe-Coupling.

No. 132,699.  Patented Oct. 29, 1872.

Witnesses.
Chas. H. Smith
Geo. T. Pinckney

INVENTOR
Melvin Stephens
Per. Lemuel W. Serrell
ATTY.

UNITED STATES PATENT OFFICE.

MELVIN STEPHENS, OF BROOKLYN, NEW YORK.

IMPROVEMENT IN PIPE-COUPLINGS.

Specification forming part of Letters Patent No. 132,699, dated October 29, 1872.

*To all whom it may concern:*

Be it known that I, MELVIN STEPHENS, of Brooklyn, in the county of Kings and State of New York, have invented an Improved Branch Coupling for Cement-Lined Pipes; and the following is declared to be a correct description of the same.

This invention is an improvement upon that for which Letters Patent were granted to me April 2, 1872; and consists in a screw-plug applied at the bottom of the socket into which the cock is screwed, so that instead of boring a hole through the metal after the cock is screwed into place it is only necessary to insert a wrench and remove the screw-plug. By this means the boring is dispensed with and the cock can be removed from one coupling to another, if required, by simply reinserting the plug, whereas in cases where the socket is bored through after the cock is in place there is no means for stopping up the hole, and the cock has to be left in the coupling uselessly should it have been applied at the wrong socket.

Figure 1:
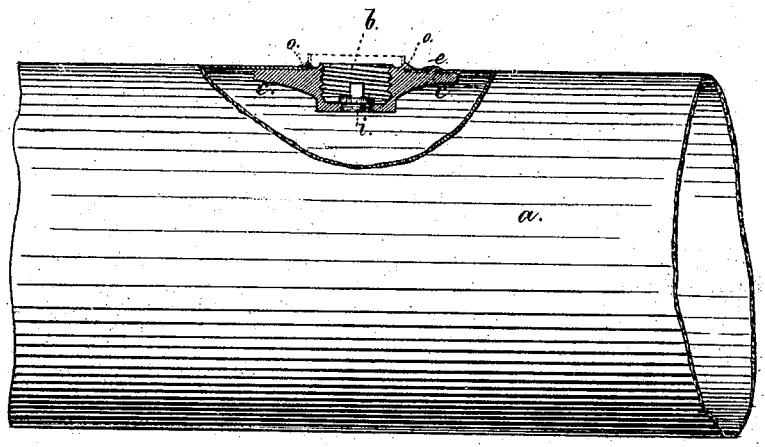
Figure 2:
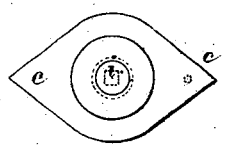

In the drawing, Figure 1 is a longitudinal section of the coupling and a portion of the cement-lined pipe; and Fig. 2 is a rear view of the coupling detached.

The sheet-iron pipe $a$ is of ordinary character, and it is to be lined with cement after the coupling has been attached to the pipe $a$, as usual. The coupling is made with a screw-socket, $b$, for receiving the stop-cock, and with wings $c$ $c$ tapering in each direction at the ends of the flange that is within the pipe; the object of these being to deflect the tool that is employed in spreading the cement upon the inside of the pipe and prevent the same being arrested by the flange. These wings being tapered to both ends, instead of only to one end, as in said patent, allow for the spreading-tool being moved in either direction; hence less care is required in properly placing the coupling in the sheet metal or in commencing to apply the cement lining at one particular end of the length of sheet-iron pipe. A projecting rivet, $e$, cast upon one of the wings $c$, serves to prevent the coupling turning, and by casting this rivet with the wing the drilling for and insertion of separate rivets are avoided. The flange $o$ is turned over, as shown, to secure the coupling to the pipe $a$. In the coupling a screw-plug, $i$, is inserted. It is of a size smaller than the bore of the cock that is screwed into the socket $b$, so that said screw-plug can be withdrawn through the cock by the application of a key with a socket at the end to receive the square upon the screw-plug. This key is of a length to pass entirely through the cock, and by means of said key the screw-plug can be removed or reinserted at pleasure.

I claim as my invention—

1. The screw-plug $i$ inserted at the bottom of the socket $b$ and removable by means of a key, in combination with said socket and attaching flange, substantially as set forth.

2. The socket for branch couplings for cement-lined pipes made with tapering wings $c$ and a projecting rivet, $e$, and flange $o$, substantially as set forth.

Signed by me this 25th day of June, A. D. 1872.

MELVIN STEPHENS.

Witnesses:
GEO. T. PINCKNEY,
CHAS. H. SMITH.